(12) United States Patent
Qiu et al.

(10) Patent No.: US 10,724,541 B2
(45) Date of Patent: Jul. 28, 2020

(54) NACELLE SHORT INLET

(71) Applicant: United Technologies Corporation, Farmington, CT (US)

(72) Inventors: Yuan J. Qiu, Glastonbury, CT (US); Robert E. Malecki, Storrs, CT (US); Wesley K. Lord, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 664 days.

(21) Appl. No.: 15/378,371

(22) Filed: Dec. 14, 2016

(65) Prior Publication Data

US 2017/0298954 A1 Oct. 19, 2017

Related U.S. Application Data

(60) Provisional application No. 62/273,576, filed on Dec. 31, 2015.

(51) Int. Cl.
*F04D 29/54* (2006.01)
*F02C 7/04* (2006.01)
(Continued)

(52) U.S. Cl.
CPC ........... *F04D 29/547* (2013.01); *B64D 33/02* (2013.01); *F02C 7/04* (2013.01); *F02K 3/06* (2013.01);
(Continued)

(58) Field of Classification Search
CPC .... F04D 29/547; F04D 29/545; F04D 29/325; F02K 3/06; F02C 7/04; B64D 33/02
See application file for complete search history.

(56) References Cited

U.S. PATENT DOCUMENTS

| | | | |
|---|---|---|---|
| 2010/0276007 A1* | 11/2010 | Hendricks | F02C 7/04 137/15.1 |
| 2013/0283821 A1 | 10/2013 | Gilson et al. | |
| 2015/0044028 A1 | 2/2015 | Lord et al. | |

FOREIGN PATENT DOCUMENTS

| | | | | |
|---|---|---|---|---|
| WO | 2014100081 A1 | 6/2014 | | |
| WO | WO-2014100081 A1 * | 6/2014 | ............. | F01D 5/141 |

OTHER PUBLICATIONS

Andreas, et al.; "Ultrashort Nacelles for Low Fan Pressure Ratio Propulsors", Transactions of the ASME: Journal of Turbomachinery., vol. 137, No. 2; Sep 10, 2014 , 14 Pages, ASME Digital Collection, Online. DOI: 10.1115/1.4028235.

(Continued)

*Primary Examiner* — Jacob M Amick
(74) *Attorney, Agent, or Firm* — Cantor Colburn LLP

(57) ABSTRACT

A fan assembly for a gas turbine engine includes a fan including a plurality of fan blades. Each fan blade extends radially outwardly from a fan hub to a blade tip. The plurality of blade tips define a fan diameter. A nacelle surrounds the fan and defines a fan inlet upstream of the fan, relative to an airflow direction into the fan. The nacelle has a forwardmost edge defining an inlet length from the forwardmost edge to a leading edge of a fan blade of the plurality of fan blades. A ratio of inlet length to fan diameter is between 0.20 and 0.45. A nacelle inner surface defines a nacelle flowpath. The nacelle flowpath has a convex throat portion and a concave diffusion portion between the throat portion and the leading edge of the fan blade at a bottommost portion of the nacelle.

17 Claims, 3 Drawing Sheets

(51) Int. Cl.
*F02K 3/06* (2006.01)
*B64D 33/02* (2006.01)
*F04D 29/32* (2006.01)

(52) U.S. Cl.
CPC .... *F04D 29/325* (2013.01); *B64D 2033/0286* (2013.01); *F05D 2220/323* (2013.01); *F05D 2240/14* (2013.01); *F05D 2240/30* (2013.01); *F05D 2250/711* (2013.01); *F05D 2250/712* (2013.01)

(56) References Cited

OTHER PUBLICATIONS

European Search Report Issued in EP Application No. 16206722.7, dated May 23, 2017, 23 Pages.
European Third Party Observations Issued in EP Application No. 1620672237-1007, dated Sep. 12, 2019, 31 Pages.
Kandebo, "Pratt & Whitney Launches Geard Turbofan Engine", Stanley W. Kandebo, Aviation Week & Space Technology, Feb. 23, 1998, East Hartford, Conn.
Zimbrick, et al., "Investigation of Very High Bypass Ratio Engines for Subsonic Transports", J. Propulsion vol. 6, No. 4, Jul.-Aug. 1990, R. A. Zimbrick and J. L. Colehour.

* cited by examiner

NACELLE SHORT INLET

CROSS REFERENCE TO RELATED APPLICATIONS

This application claims the benefit of an earlier filing date from U.S. Provisional Application Ser. No. 62/273,576 filed Dec. 31, 2015, the entire disclosure of which is incorporated herein by reference.

BACKGROUND

This disclosure relates to gas turbine engines, and more particularly to nacelle inlets for gas turbine engines.

Gas turbine engines, such as those used to power modern commercial and military aircraft, generally includes a fan section where an airflow is introduced to the gas turbine engine, a compressor section to pressurize the airflow, a combustor section for burning hydrocarbon fuel in the presence of the pressurized air, and a turbine section to extract energy from the resultant combustion gases. The airflow flows along a gaspath through the gas turbine engine. The gas turbine engine is typically enclosed in a nacelle, with the airflow introduced to the gas turbine engine at the fan via a nacelle inlet.

The nacelle inlet is utilized to smooth the airflow into the gas turbine engine, and is designed to reduce the airflow speed from upstream cruise speed of 0.8 Mach down to about 0.5 Mach. The typical nacelle inlet cross-section includes a throat at which the inlet diameter is at its narrowest and a diffuser section downstream of the throat, relative to the general flow direction of the airflow. The diffuser section typically slows the airflow just upstream of the fan.

A typical nacelle inlet is characterized by an inlet length (L), which is an axial length from a forwardmost point of the nacelle to a leading edge blade tip of the fan and a diameter (D) between opposing leading edge blade tips inlet. A conventional nacelle inlet has a ratio L/D of about 0.5. As gas turbine engine designs have evolved, designs have moved toward larger diameter fans, which require a greater inlet length to attain the L/D of 0.5. This increase in axial length of the nacelle increases overhang, adds weight and increases drag due to the nacelle, with all of these negatively affecting performance of the aircraft on which the gas turbine engine is utilized. To alleviate these issues, shorter inlet lengths have been proposed, increasing the amount of diffusion required per unit length to slow the incoming airflow to the desired 0.5 Mach. The shorter inlets result in increased airflow separation, particularly when operating at high angles of attack.

SUMMARY

In one embodiment, a fan assembly for a gas turbine engine includes a fan including a plurality of fan blades. Each fan blade extends radially outwardly from a fan hub to a blade tip. The plurality of blade tips define a fan diameter. A nacelle surrounds the fan and defines a fan inlet upstream of the fan, relative to an airflow direction into the fan. The nacelle has a forwardmost edge defining an inlet length from the forwardmost edge to a leading edge of a fan blade of the plurality of fan blades. A ratio of inlet length to fan diameter is between 0.20 and 0.45. A nacelle inner surface defines a nacelle flowpath. The nacelle flowpath has a convex throat portion and a concave diffusion portion between the throat portion and the leading edge of the fan blade at a bottommost portion of the nacelle.

Additionally or alternatively, in this or other embodiments the throat portion has a minimum throat radius measured from a fan central axis less than a maximum diffusion portion radius measured relative to the fan central axis.

Additionally or alternatively, in this or other embodiments the throat portion has a minimum throat radius measured from a fan central axis less than a blade tip radius measured relative to the fan central axis.

Additionally or alternatively, in this or other embodiments a maximum diffusion portion radius measured from a fan central axis is great than a blade tip radius as measured relative to the central axis.

Additionally or alternatively, in this or other embodiments the bottommost portion is defined as a sixty circumferential degree portion of the nacelle centered on a bottom dead center of the nacelle.

Additionally or alternatively, in this or other embodiments the fan assembly has a fan pressure ratio between 1.2 and 1.45.

Additionally or alternatively, in this or other embodiments the plurality of fan blades extend radially outwardly from a fan hub at a hub diameter, a ratio of the hub diameter to the fan diameter in the range of 0.25 to 0.45.

Additionally or alternatively, in this or other embodiments a spinner is positioned at a central fan axis further defining the nacelle flowpath between the spinner and the nacelle inner surface.

In another embodiment, a gas turbine engine includes a turbine and a fan assembly operably connected to the turbine. The fan assembly includes a fan including a plurality of fan blades. Each fan blade extends radially outwardly from a fan hub to a blade tip. The plurality of blade tips define a fan diameter. A nacelle surrounds the fan and defines a fan inlet upstream of the fan, relative to an airflow direction into the fan. The nacelle has a forwardmost edge defining an inlet length from the forwardmost edge to a leading edge of a fan blade of the plurality of fan blades. A ratio of inlet length to fan diameter is between 0.20 and 0.45. A nacelle inner surface defines a nacelle flowpath. The nacelle flowpath has a convex throat portion and a concave diffusion portion between the throat portion and the leading edge of the fan blade at a bottommost portion of the nacelle.

Additionally or alternatively, in this or other embodiments the throat portion has a minimum throat radius measured from a fan central axis less than a maximum diffusion portion radius measured relative to the fan central axis.

Additionally or alternatively, in this or other embodiments the throat portion has a minimum throat radius measured from a fan central axis less than a blade tip radius measured relative to the fan central axis.

Additionally or alternatively, in this or other embodiments a maximum diffusion portion radius measured from a fan central axis is great than a blade tip radius as measured relative to the central axis.

Additionally or alternatively, in this or other embodiments the bottommost portion is defined as a sixty circumferential degree portion of the nacelle centered on a bottom dead center of the nacelle.

Additionally or alternatively, in this or other embodiments the fan assembly has a fan pressure ratio between 1.2 and 1.45.

Additionally or alternatively, in this or other embodiments the plurality of fan blades extend radially outwardly from a fan hub at a hub diameter, a ratio of the hub diameter to the fan diameter in the range of 0.25 to 0.45.

Additionally or alternatively, in this or other embodiments a spinner is located at a central fan axis further defining the nacelle flowpath between the spinner and the nacelle inner surface.

In yet another embodiment, a nacelle for a fan of a gas turbine engine includes a forwardmost edge defining an inlet length from the forwardmost edge to a leading edge of a fan blade of a fan. A ratio of inlet length to a fan diameter is between 0.20 and 0.45. A nacelle inner surface defines a nacelle flowpath. The nacelle flowpath has a convex throat portion and a concave diffusion portion between the throat portion and the leading edge of the fan blade at a bottommost portion of the nacelle.

Additionally or alternatively, in this or other embodiments the throat portion has a minimum throat radius measured from a fan central axis less than a maximum diffusion portion radius measured relative to the fan central axis.

Additionally or alternatively, in this or other embodiments a maximum diffusion portion radius measured from a fan central axis is great than a fan radius as measured relative to the central axis.

Additionally or alternatively, in this or other embodiments the bottommost portion is defined as a sixty circumferential degree portion of the nacelle centered on a bottom dead center of the nacelle.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
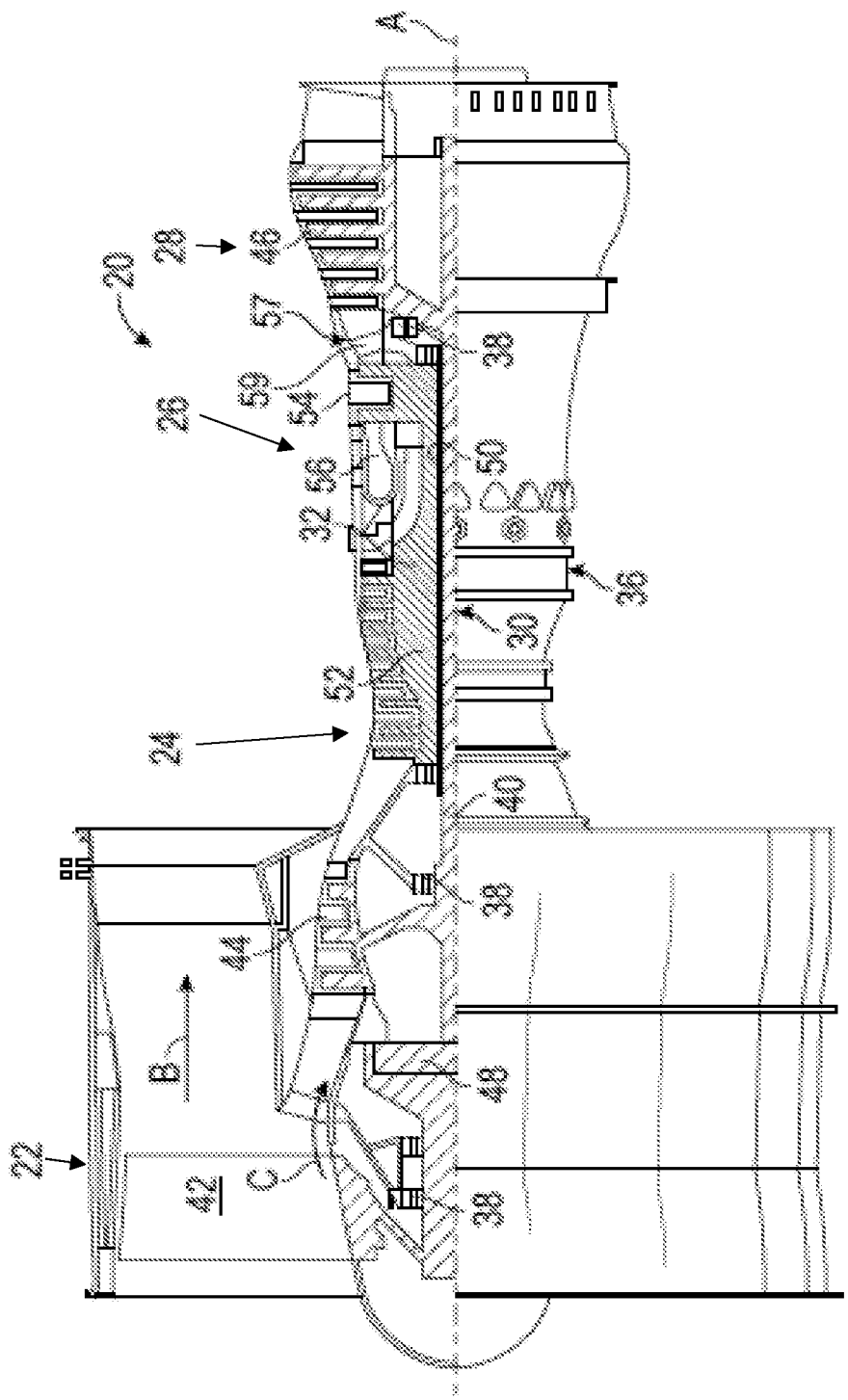
FIG. 1 illustrates a schematic cross-sectional view of an embodiment of a gas turbine engine.

FIG. 1 schematically illustrates an example gas turbine engine 20 that includes a fan section 22, a compressor section 24, a combustor section 26 and a turbine section 28. Alternative engines may include an augmenter section (not shown) among other systems or features. The fan section 22 drives air along a bypass flow path B while the compressor section 24 draws air along a core flow path C where air is compressed and communicated to the combustor section 26. In the combustor section 26, air is mixed with fuel and ignited to generate a high pressure exhaust stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines, for example, a turbine engine including three-spool architecture in which three spools concentrically rotate about a common axis and where a low spool enables a low pressure turbine to drive a fan via a gearbox, an intermediate spool that enables an intermediate turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

The combustor section 26 includes a combustor 56 arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein a "high pressure" compressor or turbine experiences a higher pressure than a corresponding "low pressure" compressor or turbine.

The example low pressure turbine 46 has a pressure ratio that is greater than about 5. The pressure ration of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as settling airflow entering the low pressure turbine 46.

The core airflow C is compressed by the low pressure compressor 44 then by the high pressure compressor 52 mixed with fuel and ignited at the combustor 56 to produce high speed exhaust gases that are then expanded through the high pressure turbine 54 and the low pressure turbine 46. The mid-turbine frame 57 includes vanes 59, which are in the core airflow path and function as an inlet guide vane for the low pressure turbine 46. Utilizing the vanes 59 of the mid-turbine frame 57 as the inlet guide vane for the low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 28 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the gas turbine engine 20 is designed for a particular flight condition—typically cruise at about 0.8 Mach and at an altitude of about 35,000 feet. The flight condition of 0.8 Mach and 35,000 feet, with the gas turbine engine 20 at its optimal fuel efficiency—also known as "bucket cruise Thrust Specific Fuel Consumption (TSFC)"—is an industry standard parameter of pound-mass (lbm) of fuel per hour being burned divided by pound-force (lbf) of thrust the gas turbine engine 20 produces at that minimum point.

"Low fan pressure ratio" is the pressure ratio across the fan blade alone, without a Fan Exit Guide Vane (FEGV) system. The low fan pressure ratio as disclosed herein according to one non-limiting embodiment is less than about 1.50. In another non-limiting embodiment the low fan pressure ratio is less than about 1.45. In some embodiments, the low fan pressure ratio is between 1.2 and 1.45.

"Low corrected fan tip speed" is the actual fan tip speed in ft/sec divided by an industry standard temperature correction of $[(Tram\ °R)/(518.7°\ R)]^{0.5}$. The low corrected fan tip speed, as disclosed herein according to one nonlimiting embodiment, is less than about 1150 ft/sec.

Figure 2:
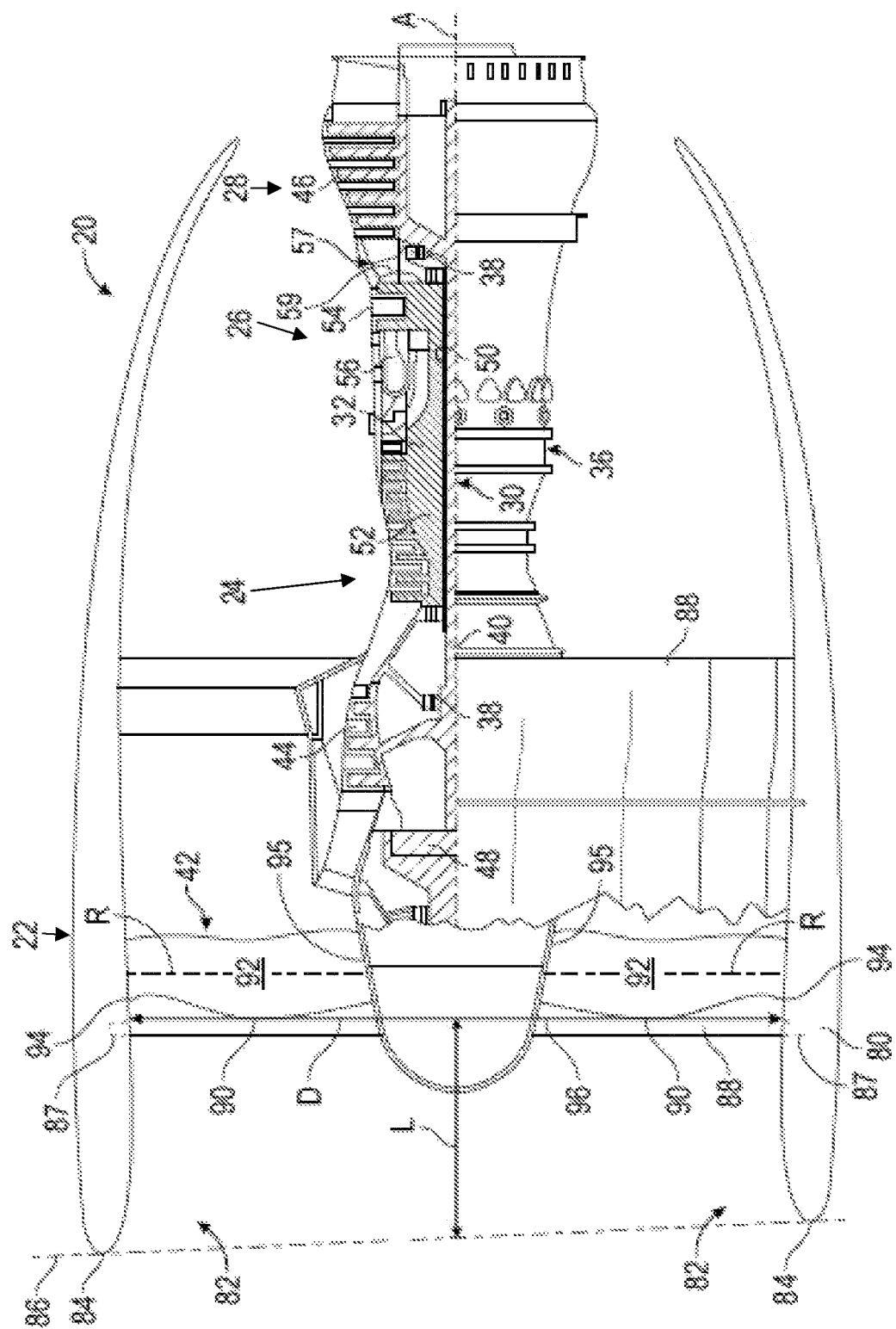
FIG. 2 illustrates a cross-sectional view of an embodiment of a fan of a gas turbine engine.

FIG. 2 illustrates an example embodiment of the gas turbine engine 20 with a nacelle 80 or cowling that surrounds the entire gas turbine engine 20. An inlet portion 82 is situated forward of the fan 42. In this example, the inlet portion 82 has a leading edge 84, which may be defined by an inlet side cut in the nacelle 80. The leading edge 84 is generally within a first reference plane 86.

The nacelle 80 in some examples includes a flange 87 that is received against a leading edge of a fan case 88. The inlet portion has a length L between a selected location corresponding to the leading edge 84, such as a location within the first reference plane 86, and a forwardmost portion 90 of leading edges of fan blades 92 of the fan 42. In this example, the length L may be considered an axial length of the inlet portion 82 because the length L is measured along a direction parallel to the central longitudinal axis A of the gas turbine engine 20. In the illustrated example, the inlet portion 82 of the nacelle 80 and the section of the fan case 88 that is forward of the fan blades 92 collectively establish the length. In other words, in this example, the length L of the inlet portion 82 includes the length of the inlet section of the nacelle 80 and a portion of the length of the fan case 88.

The fan blades 92 may be unswept as shown in FIG. 1, or may alternatively be swept fan blades 92 as shown in FIG. 2. In some examples, the fan blades 92 are conventional radial fan blades 92 or three-dimensionally swept fan blades 92. In other embodiments, the fan blades 92 may be forward-swept fan blades 92 or rearward-swept fan blades 92. In still other embodiments, the fan blades 92 may include a combination of forward sweep and rearward sweep.

The fan blades 92 establish a diameter between circumferentially outermost edges, or blade tips 94. The fan diameter D is shown in FIG. 2 as a dimension extending between the blade tips 94 of two of the fan blades 92 that are parallel to each other and extending in opposite directions from the central axis A. In the illustration, the forwardmost portions 90 of the fan blades 92 are within a second reference plane 96. In this example, the second reference plane 96 is oriented generally perpendicular to the central axis A. The first reference plane 86 in this example is oriented at an oblique angle relative to the second reference plane 96 and the central axis A. In the illustrated example, the oblique angle of orientation of the first reference plane 86 relative to the second reference plane 96 is about 5 degrees.

The length L is selected to establish a desired dimensional relationship between L and D. In some embodiments, the dimension relationship of L/D (e.g. the ratio of L/D) is between about 0.20 and 0.45. In some examples, L/D is between about 0.30 and about 0.40. In some embodiments, the ratio L/D is about 0.35.

As can be appreciated from FIG. 2, the length L of the inlet portion 82 is different at different locations along the perimeter of the nacelle 80. The second reference plane 96 is further from the first reference plane 86 nearest the top (according to the drawing) of the gas turbine engine 20 than it is nearest the bottom of the gas turbine engine 20. Thus, L is greater nearest the top of the gas turbine engine 20 than it is nearest the bottom of the gas turbine engine 20. The greatest length L in this example corresponds to a value of L/D that is no greater than about 0.45. The smallest length L in the illustrated example corresponds to a value of L/D that is at least about 0.20. The value of L/D may vary between those two values at different circumferential locations around the gas turbine engine 20. In one example where first reference plane 86 has a variable distance from the second reference plane 96, the dimensional relationship L/D is based on an average distance between the first reference plane 86 and the second reference plane 96.

Figure 3:
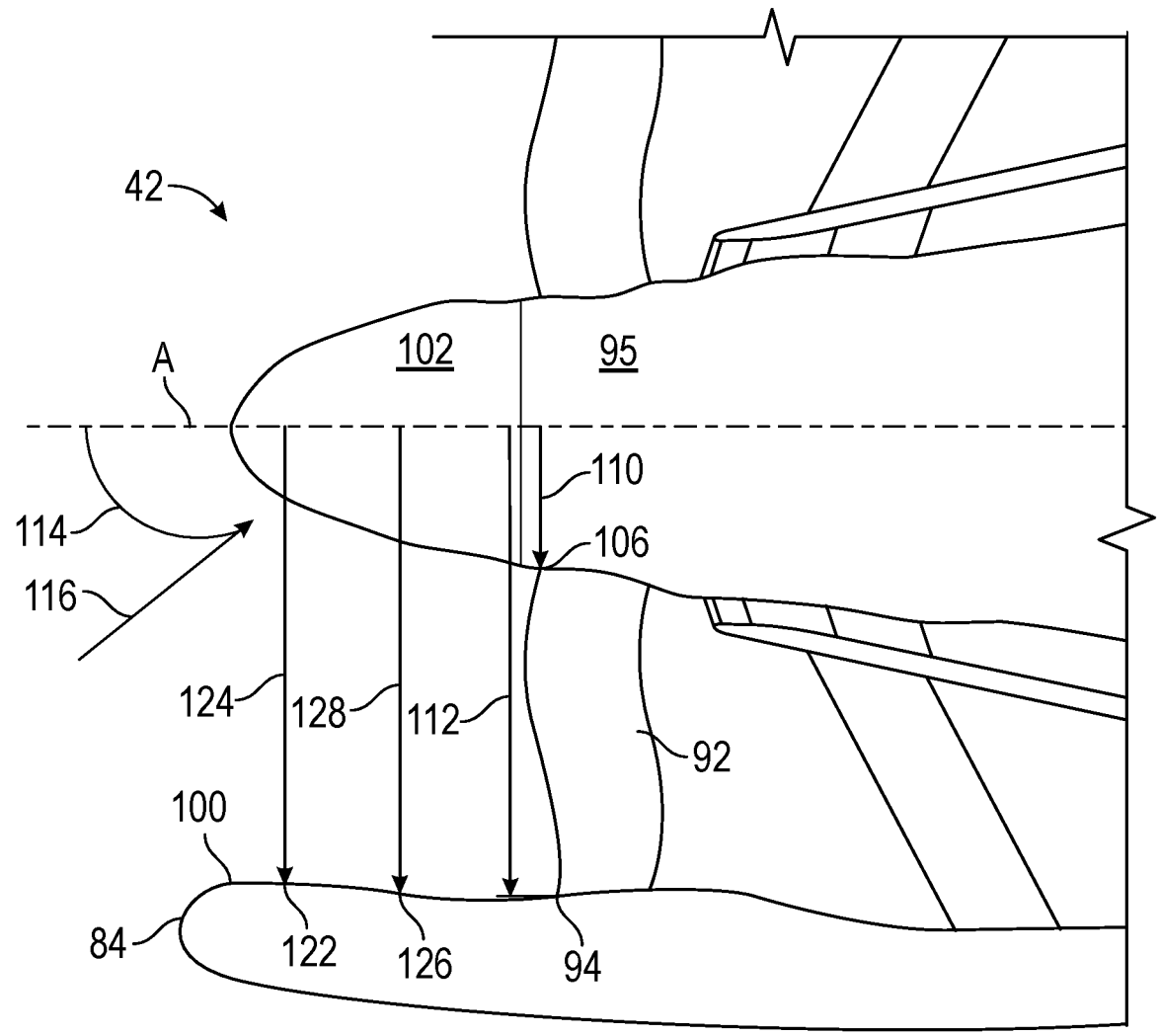
FIG. 3 illustrates a cross-section view of a bottom half of an embodiment of a fan for a gas turbine engine.

Shown in FIG. 3 is another cross-sectional view of the nacelle 80 and fan 42 of the gas turbine engine 20. The nacelle 80 includes an inner surface 100 that, together with a spinner 102 located at central axis A, defines inlet flowpath 104 for bypass airflow B and core airflow C. More particularly, inner surface 100 of the nacelle 80 defines an outer flowpath surface, while spinner 102 defines an inner flowpath surface, relative to the central axis A. The fan blades 92 extend outwardly from a blade root 106 at fan hub 95 to the blade tip 94. The fan hub 95 defines hub radius 110 at the blade root 106, as measured from central axis A, while the blade tips 94 define a tip radius 112. In some embodiments, a ratio of the hub radius 110 to the tip radius 112 is in the range of 0.25 to 0.45.

As stated above, an inlet is configured to reduce the speed of incident airflow 116 from about Mach 0.8 to about Mach 0.5. For a short inlet, in other words, an inlet with an L/D between about 0.20 and 0.45, because of reduced axial length L, the amount of diffusion required per unit length is significantly increased, making the inlet more likely to induce separation in the airflow 116, especially under high angle of attack conditions. Angle of attack 114 is the angle defined between the central axis A and a direction of incident airflow 116 at the inlet. This configuration shown in FIG. 3 manages the flow diffusion at a bottom portion, rather than eliminating diffusion. Diffusion of the inner surface 100 of the nacelle 80 at a bottom portion 120 of the nacelle 80, for example a 60 degree circumferential portion centered on a bottom dead center 118 of the nacelle 80, together with the with spinner 102 are utilized to minimize the tendency of flow separation.

To achieve the aggressive diffusion, the bottom portion 120 is configured with a convex throat portion 122 having a minimum throat radius 124 measured from the central axis A and a concave diffusion portion 126 having a maximum diffusion radius 128 measured from the central axis A. The minimum throat radius 124 is less than the maximum diffusion radius 128, and in some embodiments the minimum throat radius 124 is less than the tip radius 112. Further, in some embodiments, the maximum diffusion radius 128 is greater than the tip radius 112.

The inner surface 100 of the nacelle 80 at the bottom portion 120 allows proper airflow diffusion at the bottom of the short inlet. Further, at high angle of attack operation, a traditional short inlet has upwash of the airflow 116 entering the fan 42. The diffusion at the bottom portion 120 enables reduction of airflow upwash at the fan inlet and also reduce velocity distortion going into the fan 42. The reduced distortion of the airflow into the fan 42 has the benefit of more efficient fan operation and reduced fan distortion generated noise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A fan assembly for a gas turbine engine, comprising:
a fan including a plurality of fan blades, each fan blade extending radially outwardly from a fan hub to a blade tip, the plurality of blade tips defining a fan diameter;
a nacelle surrounding the fan and defining a fan inlet upstream of the fan, relative to an airflow direction into the fan, the nacelle having a forwardmost edge defining an inlet length from the forwardmost edge to a leading edge of a fan blade of the plurality of fan blades, a ratio of inlet length to fan diameter between 0.20 and 0.45; and
a nacelle inner surface defining a nacelle flowpath, the nacelle flowpath having a convex throat portion and a concave diffusion portion between the throat portion and the leading edge of the fan blade along a bottommost portion of the nacelle defined as a sixty circumferential degree portion of the nacelle centered on a bottom dead center of the nacelle;
wherein a first ratio of inlet length to fan diameter at a bottommost portion of the nacelle is between 0.20 and 0.45, and a second ratio of inlet length to fan diameter at a topmost portion of the nacelle is greater than the first ratio and also between 0.20 and 0.45.

2. The fan assembly of claim 1, wherein the throat portion has a minimum throat radius measured from a fan central axis less than a maximum diffusion portion radius measured relative to the fan central axis.

3. The fan assembly of claim 1, wherein the throat portion has a minimum throat radius measured from a fan central axis less than a blade tip radius measured relative to the fan central axis.

4. The fan assembly of claim 1, wherein a maximum diffusion portion radius measured from a fan central axis is greater than a blade tip radius as measured relative to the central axis.

5. The fan assembly of claim 1, wherein the fan assembly has a fan pressure ratio between 1.2 and 1.45.

6. The fan assembly of claim 1, wherein the plurality of fan blades extend radially outwardly from a fan hub at a hub diameter, a ratio of the hub diameter to the fan diameter in the range of 0.25 to 0.45.

7. A gas turbine engine, comprising:
a turbine; and
a fan assembly operably connected to the turbine including:
a fan including a plurality of fan blades, each fan blade extending radially outwardly from a fan hub to a blade tip, the plurality of blade tips defining a fan diameter;
a nacelle surrounding the fan and defining a fan inlet upstream of the fan, relative to an airflow direction into the fan, the nacelle having a forwardmost edge defining an inlet length from the forwardmost edge to a leading edge of a fan blade of the plurality of fan blades, a ratio of inlet length to fan diameter between 0.20 and 0.45; and
a nacelle inner surface defining a nacelle flowpath, the nacelle flowpath having a convex throat portion and a concave diffusion portion between the throat portion and the leading edge of the fan blade along a bottommost portion of the nacelle defined as a sixty circumferential degree portion of the nacelle centered on a bottom dead center of the nacelle;
wherein a first ratio of inlet length to fan diameter at a bottommost portion of the nacelle is between 0.20 and 0.45, and a second ratio of inlet length to fan diameter at a topmost portion of the nacelle is greater than the first ratio and also between 0.20 and 0.45.

8. The gas turbine engine of claim 7, wherein the throat portion has a minimum throat radius measured from a fan central axis less than a maximum diffusion portion radius measured relative to the fan central axis.

9. The gas turbine engine of claim 7, wherein the throat portion has a minimum throat radius measured from a fan central axis less than a blade tip radius measured relative to the fan central axis.

10. The gas turbine engine of claim 7, wherein a maximum diffusion portion radius measured from a fan central axis is greater than a blade tip radius as measured relative to the central axis.

11. The gas turbine engine of claim 7, wherein the fan assembly has a fan pressure ratio between 1.2 and 1.45.

12. The gas turbine engine of claim 7, wherein the plurality of fan blades extend radially outwardly from a fan hub at a hub diameter, a ratio of the hub diameter to the fan diameter in the range of 0.25 to 0.45.

13. The gas turbine engine of claim 7, further comprising a spinner disposed at a central fan axis further defining the nacelle flowpath between the spinner and the nacelle inner surface.

14. A nacelle for a fan of a gas turbine engine, comprising:
a forwardmost edge defining an inlet length from the forwardmost edge to a leading edge of a fan blade of a fan, a ratio of inlet length to a fan diameter between 0.20 and 0.45; and
a nacelle inner surface defining a nacelle flowpath, the nacelle flowpath having a convex throat portion and a concave diffusion portion between the throat portion and the leading edge of the fan blade along a bottommost portion of the nacelle defined as a sixty circumferential degree portion of the nacelle centered on a bottom dead center of the nacelle;

wherein a first ratio of inlet length to fan diameter at a bottommost portion of the nacelle is between 0.20 and 0.45, and a second ratio of inlet length to fan diameter at a topmost portion of the nacelle is greater than the first ratio and also between 0.20 and 0.45.

15. The nacelle of claim 14, wherein the throat portion has a minimum throat radius measured from a fan central axis less than a maximum diffusion portion radius measured relative to the fan central axis.

16. The nacelle of claim 14, wherein a maximum diffusion portion radius measured from a fan central axis is greater than a fan radius as measured relative to the central axis.

17. The fan assembly of claim 1, wherein the ratio of inlet length to fan diameter is 0.20 at a bottommost portion of the nacelle.

* * * * *